United States Patent
Edwards, Jr. et al.

(10) Patent No.: US 7,496,952 B2
(45) Date of Patent: Feb. 24, 2009

(54) METHODS FOR AUTHENTICATING A USER'S CREDENTIALS AGAINST MULTIPLE SETS OF CREDENTIALS

(75) Inventors: Robert Blair Edwards, Jr., Susquehanna, PA (US); Michael Allen Kaczmarski, Tucson, AZ (US); Omar Bond Vargas, Port Orange, FL (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 10/112,135

(22) Filed: Mar. 28, 2002

(65) Prior Publication Data

US 2004/0049697 A1 Mar. 11, 2004

(51) Int. Cl.
| | |
|---|---|
| G06F 7/04 | (2006.01) |
| G06F 15/16 | (2006.01) |
| G06F 17/30 | (2006.01) |
| H04L 9/32 | (2006.01) |
| G06K 19/00 | (2006.01) |
| G06F 7/00 | (2006.01) |
| G06F 12/00 | (2006.01) |

(52) U.S. Cl. .............. 726/4; 726/5; 713/155; 707/1; 707/2; 707/9; 707/200
(58) Field of Classification Search .......... 713/201
See application file for complete search history.

(56) References Cited

U.S. PATENT DOCUMENTS

| | | | | |
|---|---|---|---|---|
| 5,182,705 | A | * | 1/1993 | Barr et al. .................. 705/11 |
| 5,557,515 | A | * | 9/1996 | Abbruzzese et al. ......... 705/9 |
| 5,745,752 | A | | 4/1998 | Hurvig et al. |
| 5,768,503 | A | | 6/1998 | Olkin |
| 5,875,296 | A | | 2/1999 | Shi et al. |
| 5,923,842 | A | | 7/1999 | Pedersen et al. |
| 5,941,947 | A | * | 8/1999 | Brown et al. ................ 709/225 |
| 5,983,353 | A | * | 11/1999 | McHann, Jr. ................ 713/310 |
| 5,987,134 | A | * | 11/1999 | Shin et al. ................... 713/159 |
| 5,999,711 | A | * | 12/1999 | Misra et al. .................. 726/4 |

(Continued)

FOREIGN PATENT DOCUMENTS

JP 10312361 A 11/1998

OTHER PUBLICATIONS

Bina, Eric. McCool, Rob. Jones, Vicki, Winslett, Marianne. "Secure Access to Data Over the Internet". Pub 1994. Proceedings of the Third International Concerence on Parallel and Distributed Information Systems. Found on the World Wide Web at: http://ieeexplore.ieee.org/stamp/stamp.jsp?arnumber=331727&isnumber=7843.*

(Continued)

*Primary Examiner*—Christopher A Revak
*Assistant Examiner*—Jeremiah Avery
(74) *Attorney, Agent, or Firm*—Konrad Raynes & Victor LLP (57) ABSTRACT

Provided are methods for authenticating the identity of a user for use in a distributed computer network including multiple sets of access credentials. A user request, including the user's input credentials, is received, and then compared simultaneously to multiple sets of access credentials in order to verify the user's input credentials. When the user's input credentials are verified, the appropriate level of access authority is then determined, and proper access is granted to the user.

18 Claims, 4 Drawing Sheets

U.S. PATENT DOCUMENTS

| | | | |
|---|---|---|---|
| 6,052,785 A * | 4/2000 | Lin et al. | 726/5 |
| 6,349,338 B1 * | 2/2002 | Seamons et al. | 709/229 |
| 6,460,041 B2 * | 10/2002 | Lloyd | 707/10 |
| 6,505,193 B1 * | 1/2003 | Musgrave et al. | 707/3 |
| 6,609,113 B1 * | 8/2003 | O'Leary et al. | 705/39 |
| 6,643,774 B1 * | 11/2003 | McGarvey | 713/155 |
| 6,704,714 B1 * | 3/2004 | O'Leary et al. | 705/39 |
| 6,769,068 B1 * | 7/2004 | Brozowski et al. | 726/5 |
| 6,853,988 B1 * | 2/2005 | Dickinson et al. | 705/75 |
| 6,892,307 B1 * | 5/2005 | Wood et al. | 726/8 |
| 6,910,136 B1 * | 6/2005 | Wasserman et al. | 726/4 |
| 7,036,013 B2 * | 4/2006 | Renganarayanan et al. | 713/178 |
| 2003/0046260 A1 * | 3/2003 | Satyanarayanan et al. | 707/1 |

OTHER PUBLICATIONS

IBM Corporation, entitled "Temporary Global Password", published Mar. 1993 by the Software Patent Institute Database, Serial No. TDB0393.0040, U.S.

CyberTrust, a GTE company and enCommerce, Inc., entitled "Business Wire" dated Jun. 30, 1999, Record No. 55033938. Needham Heights, Mass.

W.R. Shockley, entitled Identification and Authentication when Users have Multiple Accounts, dated 1993 ACM 0-89791-635-2, Salinas, California.

* cited by examiner

METHODS FOR AUTHENTICATING A USER'S CREDENTIALS AGAINST MULTIPLE SETS OF CREDENTIALS

BACKGROUND OF THE INVENTION

1. Field of the Invention

The present invention relates to methods and associated hardware and software systems for authenticating the identity of a user for use in a distributed computer network. More particularly, the invention relates to methods and systems for authenticating the identity of a user from multiple sites of access against multiple sets with possible different levels of access credentials.

2. General Background and State of the Art

Authentication is the process of determining that an authorized user has initiated a request and that the request was not modified improperly by an interloper on the way to the destination. For example, when a person requests access to a host computer (or an automatic teller machine, telephone banking system, or any other type of computer), how does the host know who that person is? How does the host know he or she is not someone else trying to falsify the user's identity? Traditionally, passwords solve this problem. A person enters his or her password, and the host confirms that it is correct. Both the user entering the password and the host know this secret piece of knowledge and the host requests it from the user every time he or she tries to log in. Upon receiving a username and password from the user, a host computer compares the password to a list of authorized usernames in an access control file, and if the password matches the password associated with that username, the host computer allows access.

In the situation just described, however, it is assumed that the user and host are communicating over a secure connection; otherwise, interlopers could intercept the communications from the user to the host and steal the username and password information. The interloper could then illegally access the host at a later time by using the stolen username and password information. In a networked system comprising multiple interconnected computers, a first computer may request service from a second computer or destination server. This first computer is typically called a client. In order to receive service from a destination server, the client must begin by authenticating itself with the destination server. However, because the client may be communicating to the destination server over an insecure line, the client cannot simply send a password in the clear. Instead, the client and the destination server may engage in a multiple query and response exchange, constituting an authentication process, which will convince the destination server that the requesting client is an authorized user.

Storage management systems, such as IBM®'s Tivoli® Storage Manager (TSM) product, provide backup/archive and space management support through the migration of less frequently used files to storage in order to free space. In a storage management environment, the server provides hierarchical storage management and flexibility through the backup of files on tape drives, optical disks, and other storage medium. The backup feature saves copies of files from a client computer to a storage space managed by a server. Thus, data at a client computer is protected in the event of data loss due to a hardware or software failure, accidental deletion, and/or logical corruption. In a typical storage management system, clients can backup volumes, directories, subdirectories or files. Some storage management systems allow incremental backup of only those files that have been changed. In this way, the storage management system avoids the need to do a full dump to backup as only those files that are modified are backed up. This incremental backup reduces network utilization and traffic, as well as storage space.

Storage management systems typically define users having different access privileges. Each user is assigned different privileges for the various resources located on the server. For example, some users may be permitted to make changes to files backed up from other users machines, while others only have access to their own files. In this example, access privilege setting therefore defines which files a particular network user is allowed to view and/or change. Granting users access to a system in a networked environment requires the use of an authentication system to ensure security. Administrative privileges are used to manage the resources of the storage management server, set policies for managing user data, register, update, and delete new users.

Storage management systems such as the TSM system have two broad classes of users: client node users and administrators. Client node users are general users, given the name "node" because they store or "own" data on the server. They have general access to functions such as manipulating files that are shared amongst other users on the network, and backing up data local to their own computer onto the server for safekeeping. Other users, such as administrators are not associated with ownership of backup or archive data and have authorities that determine which aspects of the storage management system that they can control, such as the storage hierarchy, policy, and server settings. Administrators are responsible for ensuring that the entire system is running smoothly. Typically they assign different levels of access privileges to users for manipulating resources on the system. System administration of the network has traditionally been done directly from a console connected to the server, or from other locations running specially designated administrator software or programs.

The system distinguishes node users from admin users by maintaining them as separate ID's in separate database tables. These tables do not share the same common name space. That is, there can exist both a node ID and an admin ID of the same name. Authentication of each type of user would be performed separately. Since client node users usually access the system from designated locations, those locations only authenticate users against the appropriate table of node users in the database. Similarly, administrative computers performed authentication only against the admin table of ID's. Traditionally, this has not been a problem because node type operations have always been separate from admin type operations; node users typically access the system from their desktop computer which runs client node software, and administrators access the system from the server console or other machine running administrator The present invention addresses the shortcomings of the prior art.

SUMMARY

The present invention provides methods for authenticating the identity of a user for use in a distributed computer network including multiple sets of access credentials.

One method in accordance with the present invention comprises the following:

Receiving a user request including the user's input credentials, for access to the computer network or a subcomponent thereof. The method also includes simultaneously comparing the received user input credentials to multiple sets of access credentials to verify the input credentials.

The method also includes determining the appropriate level of access authority for said verified input credentials of said user.

The present invention addresses the shortcomings of the prior art by authenticating a user of any access authority, regardless of his or her location and without specifying the level of access authority intended, thereby granting the user access to the computer network. For example, the present invention allows a user to be authenticated regardless of the specific machine, location of the machine, IP address, or MAC address (a hardware address that is unique to each network interface card so that individual targets can be identified and addressed for low-level network communications), and also without the user specifying whether they intend to login as a client node user or as administrator.

The present invention accomplishes these and other objects by simultaneously comparing the user's input credentials against multiple sets of access credentials. The present invention presents a "single user ID" concept to the user, but still maintains the IDs in separate name spaces. It is indeed possible for the user to have both node ID and admin ID. Since a single user ID concept is being presented to the user, the user is not asked to indicate the type of user intended for login. Instead, proper level of access authority is determined by simultaneously authenticating the user ID against both admin ID and the node ID. As used herein, the term "simultaneously" is intended to cover events occurring at substantially the same moment in time, such that the event occurrences overlap at least partially in time. Comparison of the results of each authentication indicates which ID is intended by the user. Authentication is typically performed against a single set of credentials or authority name space. The present invention, however, performs multiple authentications against multiple credentials or name spaces where the names spaces have a hierarchical organization. The highest name space against which the credentials are verified determined the requestor's authority.

The present invention allows for determination of the appropriate level of access authority by comparing the results of the parallel authentication process. Each type of user or appropriate name space is given an ordering or ranking so that if authentication is successful in more than one name space, the highest level of authority is used to determine the identity of the user. This mechanism can be used in situations where multiple networked applications are accessed in a heterogeneous environment.

The present invention can of course be used with any type of distributed computer network, or any smaller subcomponent thereof. Included in these distributed computer networks are Storage Management Systems such as the Tivoli® Storage Manager Product mentioned above. The present invention is particularly directed towards solving the problem of authentication in a Storage Management System such as the Tivoli® Storage Manager Product, however the present invention is not limited to Storage Management Systems. The teachings of the present invention can be applied to any distributed computer network or subcomponent thereof, which includes multiple sets of access credentials.

The methods and systems of the present invention as described above have several advantages. For example, this solution means that the node and admin tables do not need to be merged into one table, thus preventing the users from having to deal with migration issues. Furthermore, it is advantageous that the user is not required to specify which type of identification level they are using; admin, node, or other id. The user simply enters their username and password, authentication is performed against multiple namespaces, and the highest level of authority for which the login is successful is assigned to the user.

The foregoing and other objects, features, and advantages of the present invention will be become apparent to those skilled in the art from a reading of the following detailed description of exemplary embodiments, which illustrate the features and advantages of the invention in conjunction with references to the accompanying drawing figures.

DETAILED DESCRIPTION OF THE EXEMPLARY EMBODIMENTS

Figure 1:
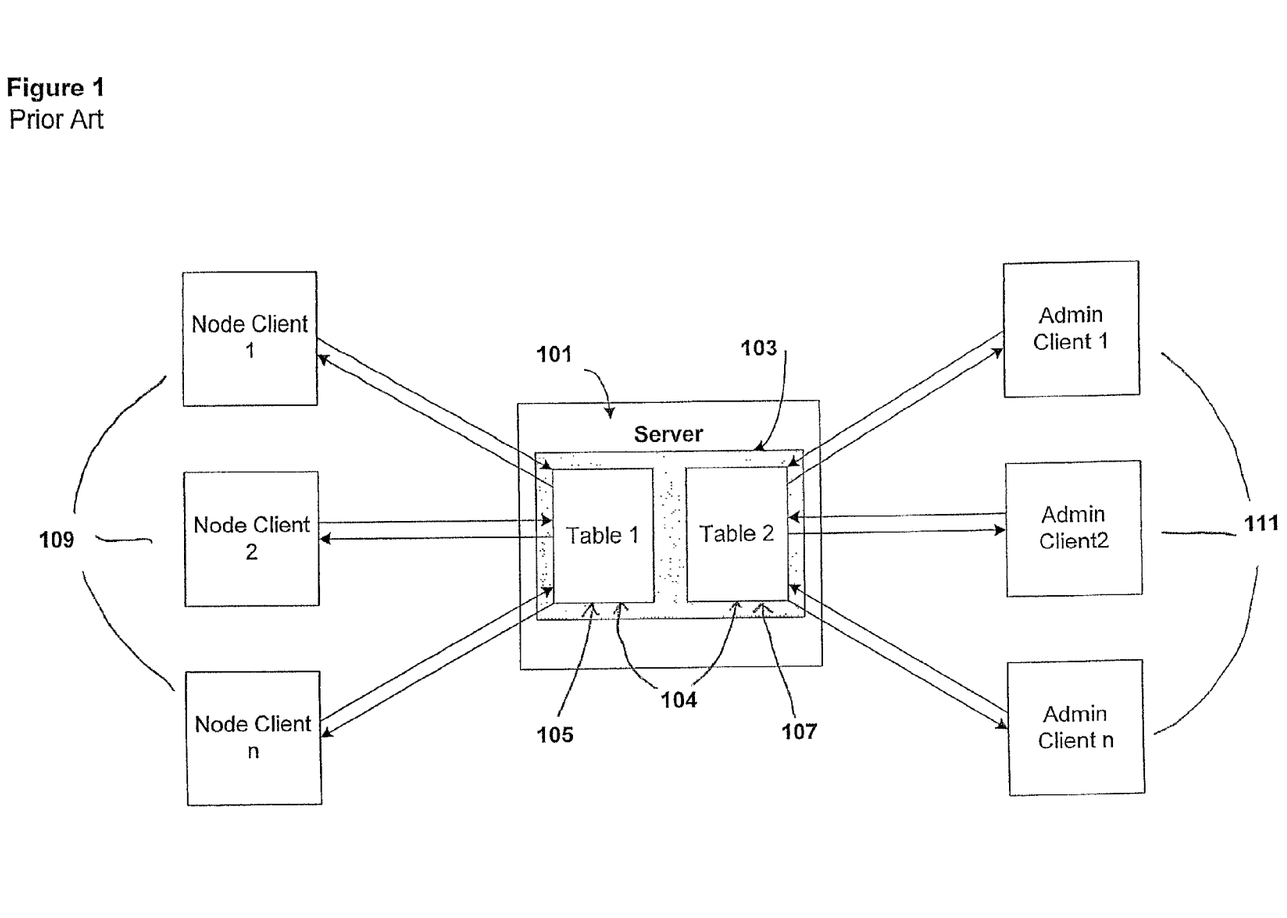
FIG. 1 is a diagram illustrating a system exemplary of the prior art.

FIG. 1 illustrates a system representative of the prior art. A server 101 is shown, on which is located a database 103. Database 103 contains at least two tables 104, each containing recorded credentials and authentication information used for validating users' credentials. Included in FIG. 1 is a node table 105 and an admin table 107. The node table 105 contains recorded credential information for all the node users, and admin table 107 contains recorded credentials for all the admin users. Surrounding the server are a number of client machines, all connected to the server via a communications network. One area of the network contains clients that are all designated as client node machines 109. These may simply be desktop computers or workstations that users login to the server from their offices each day.

There is another area separate from the first area containing client machines designated as administrators 111. The admin area may include the console directly connected to the server as well as other types of client machines. Authentication of users located within the node area is done using the content of node table 105 on the server, which contains the recorded credentials for all the node users. Authentication of users located within the admin area is similarly accomplished using the content of the admin table 107 on the server, which contains the recorded credentials for all the admin users. Each type of user id is mapped to a specific name space, and authentication occurs only within one name space. Only the users with the credentials stored in admin table 107 may login from the administrator machines 111; and only the users with the credentials stored in node table 105 may login from the node machines 109.

Figure 2:
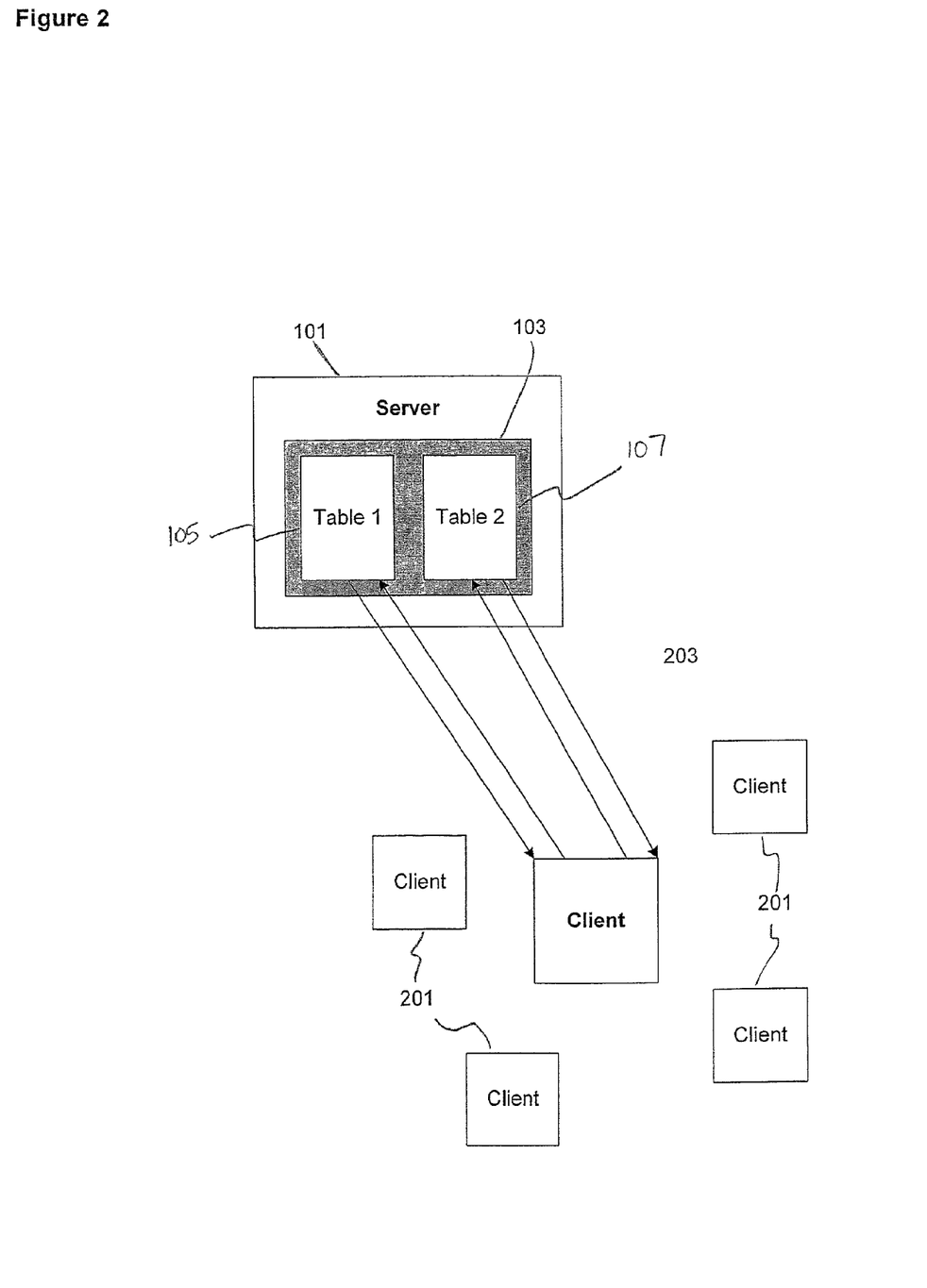
FIG. 2 illustrates an exemplary embodiment of the present invention.

FIG. 2 illustrates the features of an exemplary embodiment of the present invention. It should be appreciated by those skilled in the art that the present invention can be practiced utilizing many components of existing hardware. Accordingly, where existing hardware is used to practice the present invention, similar reference numerals will be used. Again shown in FIG. 2 is server 101, on which resides a database 103 containing multiple tables. Also, shown in FIG. 2 are the exemplary node table 105 and admin table 107. Each table contains access credentials for different classes of users.

With reference to the present invention, surrounding server 101 are a number of client machines 201 which may have access to server 101. Any user may be connecting to server 101 from any of these clients 201. A user that attempts to login to the inventive system of the present invention need not specify the type of login he wishes, or similarly, the user need not specify a particular name space. Instead, each user of the present invention is authenticated amongst each node table 105 and admin table 107 in the database containing recorded credentials on server 101 of the present invention. The appropriate login is then granted to the user by comparing the results of each of the authentications and granting the highest level of authority for which the user is allowed. Furthermore, in accordance with the teachings of the present invention, this authentication against each table 105 and 107 is performed simultaneously.

Figure 3:
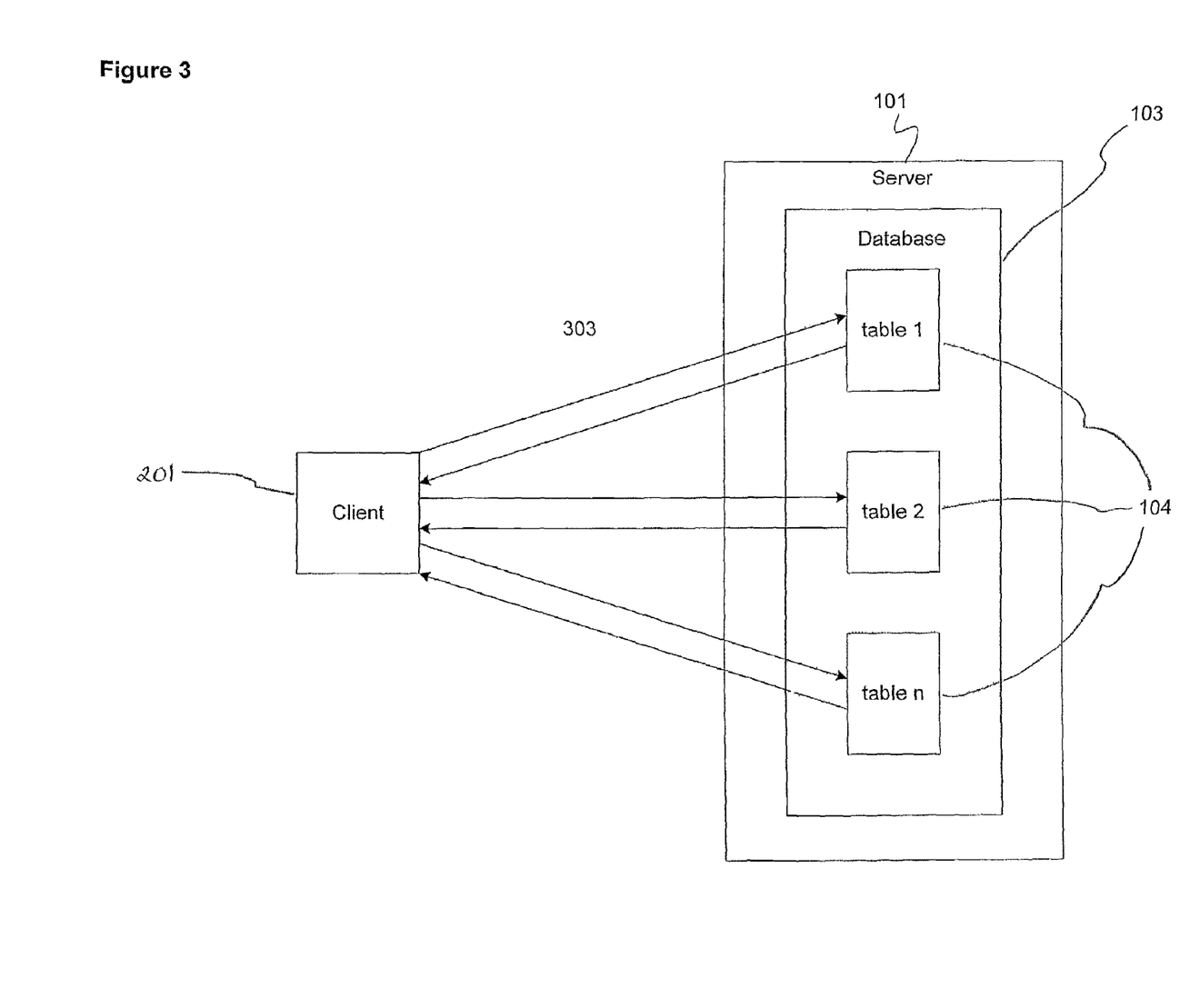
FIG. 3 illustrates further details of a method according to an exemplary embodiment of the present invention.

Turning next to FIG. 3, a diagram is provided which illustrates the structure of a system according to another embodiment of the present invention. In this embodiment client machine 201 is connected to server 101. The location of the client 201 is not specified, and likewise the type of user accessing the server via the client is not specified either. The client 201 prompts the user for some information regarding their identity; this is usually accomplished, for example, by providing a username and password. Residing on the server 101 is database 103, which contains, amongst others, several tables 104 that contain important credentials necessary for authentication of users on this system.

In one embodiment of the present invention, there only exist two tables, one containing access credentials for the node users, and the other containing access credentials for the administrators. Other embodiments of the invention may utilize more than two tables, each containing varying classes of credentials. The actual authentication process 303 of the present invention is represented by the bi-directional arrows between the client 201 and tables on the server 101. One skilled in the art should note from FIG. 3 that exchanges 303 are occurring simultaneously.

Figure 4:
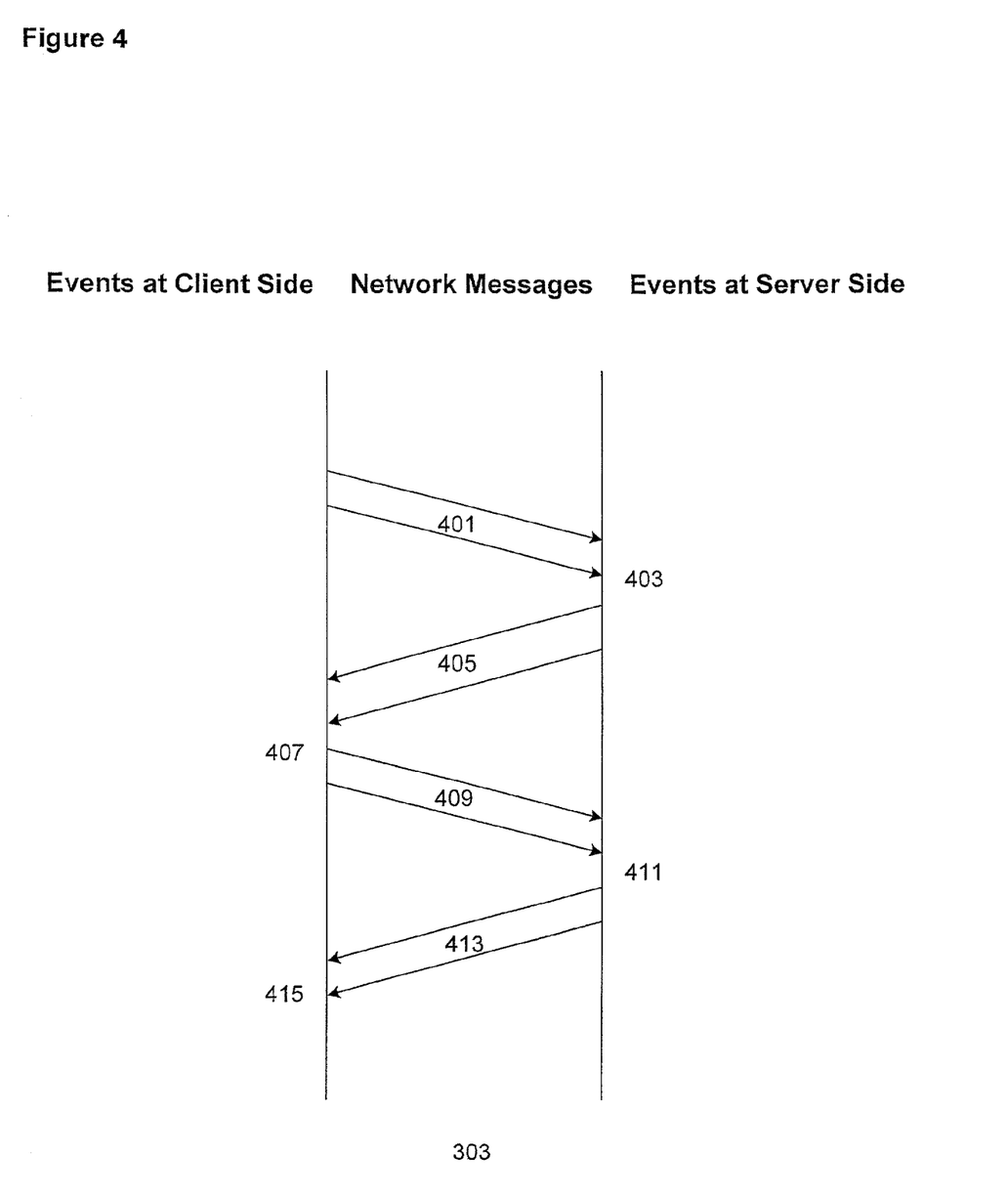
FIG. 4 illustrates details of the exchanges involved in an authentication process exemplary of the present invention.

FIG. 4 further illustrates in additional detail the inventive parallel authentication process of the present invention as shown at 203 in FIG. 2 and 303 in FIG. 3. Events at the client side are shown on the left side of FIG. 4, and events at the server side are shown on the right side of FIG. 4. The network messages are shown in between the vertical lines. "Pseudocode" is used to define the illustrative features of the present invention and is further described below.

The client first builds a request key (RK) from the user's password. For a human user, the request key is their encrypted password. The request key (RK) is derived from a known encryption of the password using a encryption function (Ek). The authentication system of the present invention keeps a database of clients and their request keys. Network services requiring authentication, as well as clients who wish to use these services, register their request key with the authentication system. Because the system knows every potential user's request key, it can create messages that convince one entity of another entity's identity. The request key is used to pass securely to the server the identity of the client. It also contains information that the server can use to ensure that the client is the same client to whom authentication is granted. Authentication is good for a single server and a single client.

The authentication system also creates random session keys (SK) which are given to a client and a server and no one else. A validation token (V) is an additional credential that the client randomly generates each time it wishes to use a service on the server. The client then builds a validation token and also builds a random session key. The validation tokens are what are used at the end of the authentication process to validate whether or not the user is authorized or not to access the server.

The client builds the first set of node and admin messages 401 containing the randomly generated session key SK and a validation token V. The client encrypts the messages using its request key RK, and sends them to the server requesting a ticket for the server.

The server then looks up the client's request key in its database and uses it to decode the node and admin messages 403 received from the client. The server now knows the session key SK and the validation token V that the client sent.

The server now randomly generates its own validation token (Y) to send to the client. It encrypts this validation token (Y) and the client's validation token as it has just decoded, together with the session key SK. The server builds an encrypted second set of node and admin messages 405 and sends these back to the client.

The node and admin messages sent from the server are received and decoded by client 201. Upon receiving node and admin messages 407, client 201 decrypts them using the session key SK that it generated when first sending the authentication request to the server. The Client 201 also already knows V, since this was the validation token it generated and sent to the server earlier. Client 201 now determines the server's validation token Y.

Client 201 then builds a third set of node and admin messages containing the server's validation token as decoded and sends them 409 to the server using the session key.

The server decodes the third set 411 of node and admin messages received from the client. If the client is who they say they are, the validation token generated by the server as decoded by the client will be the same as the original validation token generated by the server. The server therefore compares the original validation token generated by the server Y with the node and admin validation tokens as decoded by client and sends a success/failure message 413 to the client. Similarly, the client can also compare the original validation token V it generated with the node and admin validation tokens as decoded by the server to decide success/failure of the server.

In contrast to known authentication systems, the present invention is unique in that multiple namespaces are queried simultaneously for authentication of a single user.

The implementation of the methods of the present invention amount to parallel authentication processing through a single set of verb exchanges to determine which name spaces the authenticating part is authorized in. To the user it appears as a single login. To the authenticating party it is a determination of the name space in which the user is authorized without the user having to remember the name space.

Exemplary embodiments of the invention have been described. It is to be understood that the present invention embraces many other embodiments and configurations and has many other benefits. For example, the present invention can be used to authenticate over systems that have any number of different types of users, where different types of users are located in different name spaces and are not limited to being node or admin users. Also, the present invention may be practiced with systems other than TSM. Further, the present invention may be used to authenticate users over a variety of computer communications network environments as well as being used for simultaneous authentication to multiple machines.

The present invention is limited solely by the claims that now follow.

We claim:

1. A method for determining an appropriate level of access authority for a person in a distributed computer network including multiple sets of access credentials, the method comprising:

maintaining a set of access credential information for node users;

maintaining a set of access credential information for admin users; wherein the set of access credential information for node users and the set of access credential information for admin users are maintained in respective separate name spaces;

receiving the person's request for access to the computer network or a subcomponent thereof, wherein the request includes the person's input credentials;

comparing the person's input credentials to the set of access credential information for node users, wherein the set of access credential information for node users is stored in a node table in a database;

determining whether the person's input credentials are successfully verified against the set of access credential information stored in the node table, and if so, an authentication against the set of access credential information stored in the node table is successful;

comparing the person's input credentials to the set of access credential information for admin users, wherein the set of access credential information for admin users is stored in an admin table in the database;

determining whether the person's input credentials are successfully verified against the set of access credential information stored in the admin table, and if so, an authentication against the set of access credential information stored in the admin table is successful;

wherein the operation of comparing the person's input credentials to the set of access credential information for node users at least partially overlaps in time with the operation of comparing the person's input credentials to the set of access credential information for admin users;

wherein the node table contains a set of access credential information for a different class of users than the set of access credential information contained in the admin table;

wherein the node table and the admin table are ranked, with the admin table having a higher ranking than the node table;

comparing results of the authentication against the set of access credential information stored in the node table and results of the authentication against the set of access credential information stored in the admin table;

ascertaining a level of access authority for the person, without the person specifying an intended level of access authority, wherein the ascertained level of access authority corresponds with the highest ranked set of access credentials for which authentication is successful; pg,17 and wherein the appropriate level of access authority for the person is ascertained without regard to a specific machine, a location of the machine, an IP address of the machine, and a MAC address of the machine, from which the person's request is received.

2. The method of claim 1 wherein the person's input credentials include a username and password which cause the authentication to be successful for the node table and the admin table.

3. The method of claim 1, further comprising:

comparing the person's input credentials to a third set of access credential information for a third set of users stored in a third table;

determining whether the person's input credentials are successfully verified against the third set of access credential information stored in the third table, and if so, an authentication against the third set of access credential information stored in the third table is successful;

wherein the operation of comparing the person's input credentials to a third set of access credential information for a third set of users at least partially overlaps in time with the operation of comparing the person's input credentials to a set of access credential information for node users and with the operation of comparing the person's input credentials to a set of access credential information for admin users;

wherein the node table and the admin table and the third table are in the database;

wherein the third table contains a set of access credential information for a different class of users than the set of access credential information contained in the node table and the set of access credential information contained in the admin table; and wherein the node table and the admin table and the third table are ranked.

4. The method of claim 3, further comprising:

comparing the person's input credentials to a fourth set of access credential information for a fourth set of users stored in a fourth table;

determining whether the person's input credentials are successfully verified against the fourth set of access credential information stored in the fourth table, and if so, an authentication against the fourth set of access credential information stored in the fourth table is successful;

wherein the operation of comparing the person's input credentials to a fourth set of access credential information for a fourth set of users at least partially overlaps in time with the operation of comparing the person's input credentials to a set of access credential information for node users and with the operation of comparing the person's input credentials to a set of access credential information for admin users and with the operation of comparing the person's input credentials to a third set of access credential information for a third set of users;

wherein the node table and the admin table and the third table and the fourth table are in the database;

wherein the fourth table contains a set of access credential information for a different class of users than the respective sets of access credential information contained in the node table and the admin table and the third table; and wherein the node table and the admin table and the third table and the fourth table are ranked.

5. The method of claim 4, wherein the person's input credentials include a password, and wherein the method further comprises building a request key from the person's password.

6. The method of claim 5, further comprising creating random session keys.

7. The method of claim 6, further comprising building a set of node and admin messages containing a decoded validation token.

8. The method of claim 1 wherein the authentication against the node table is performed in parallel with the authentication against the admin table.

9. A method for determining an appropriate level of access authority for a person in a distributed computer network including multiple sets of access credentials, the method comprising:

accepting the person's request for access to the computer network, wherein the request includes the person's input credentials;

maintaining a set of access credential information for a first class of users;

maintaining a set of access credential information for a second class of users; wherein the set of access credential information for the first class of users and the set of access credential information for the second class of users are maintained in respective separate name spaces;

comparing the person's input credentials to the set of access credential information for the first class of users, wherein the set of access credential information for the first class of users is stored in a first table;

determining whether the person's input credentials are successfully verified against the set of access credential information stored in the first table, and if so, an authentication against the set of access credential information stored in the first table is successful;

comparing the person's input credentials to the set of access credential information for the second class of users, wherein the set of access credential information for the second class of users is stored in a second table;

determining whether the person's input credentials are successfully verified against the set of access credential information stored in the second table, and if so, an authentication against the set of access credential information stored in the second table is successful;

wherein the operation of comparing the person's input credentials to the set of access credential information for the first class of users at least partially overlaps in time with the operation of comparing the person's input credentials to the set of access credential information for the second class of users;

wherein the first table and the second table are in a single database;

wherein the first class of users is a different class than the second class of users;

wherein the first table and the second table are ranked, with the second table having a higher ranking than the first table;

comparing results of the authentication against the set of access credential information stored in the first table and results of the authentication against the set of access credential information stored in the second table;

ascertaining a level of access authority for the person, without the person specifying an intended level of access authority, wherein the ascertained level of access authority corresponds with the highest ranked set of access credentials for which authentication is successful;

and wherein the appropriate level of access authority for the person is ascertained without regard to a specific machine, location of the machine, IP address of the machine, and MAC address of the machine, from which the person's request is received.

10. The method of claim 9 further comprising:

comparing the person's input credentials to a third set of access credential information for a third class of users stored in a third table;

determining whether the person's input credentials are successfully verified against the third set of access credential information stored in the third table, and if so, an authentication against the third set of access credential information stored in the third table is successful;

wherein the operation of comparing the person's input credentials to a third set of access credential information for a third class of users at least partially overlaps in time with the operation of comparing the person's input credentials to the set of access credential information for the first class of users and with the operation of comparing the person's input credentials to the set of access credential information for the second class of users;

wherein the first table and the second table and the third table are in a single database;

wherein the third table contains a set of access credential information for a different class of users than the set of access credential information contained in the first table and the set of access credential information contained in the second table; and wherein the first table and the second table and the third table are ranked.

11. The method of claim 10, further comprising:

comparing the person's input credentials to a fourth set of access credential information for a fourth class of users stored in a fourth table;

determining whether the person's input credentials are successfully verified against the fourth set of access credential information stored in the fourth table, and if so, an authentication against the fourth set of access credential information stored in the fourth table is successful;

wherein the operation of comparing the person's input credentials to a fourth set of access credential information for a fourth class of users at least partially overlaps in time with the operation of comparing the person's input credentials to the set of access credential information for the first class of users and with the operation of comparing the person's input credentials to the set of access credential information for the second class of users and with the operation of comparing the person's input credentials to a third set of access credential information for a third set of users;

wherein the first table and the second table and the third table and the fourth table are in a single database;

wherein the fourth table contains a set of access credential information for a different class of users than the respective sets of access credential information contained in the first table and the second table and the third table; and wherein the first table and the second table and the third table and the fourth table are ranked.

12. The method of claim 9 wherein the authentication against the first table is performed in parallel with the authentication against the second table.

13. The method of claim 11, further comprising:

comparing the person's input credentials to a fifth set of access credential information for a fifth class of users stored in a fifth table;

determining whether the person's input credentials are successfully verified against the fifth set of access credential information stored in the fifth table, and if so, an authentication against the fifth set of access credential information stored in the fifth table is successful;

wherein the operation of comparing the person's input credentials to a fifth set of access credential information for a fifth class of users at least partially overlaps in time with the operation of comparing the person's input credentials to the set of access credential information for the first class of users and with the operation of comparing the person's input credentials to the set of access credential information for the second class of users and with the operation of comparing the person's input credentials to a third set of access credential information for a third class of users and with the operation of comparing the person's input credentials to a fourth set of access credential information for a fourth class of users;

wherein the first table and the second table and the third table and the fourth table and the fifth table are in a single database;

wherein the fifth table contains a set of access credential information for a different class of users than the respective sets of access credential information contained in the first table and the second table and the third table and the fourth table; and wherein the first table and the second table and the third table and the fourth table and the fifth table are ranked.

14. The method of claim 13 wherein the fourth table and the fifth table have a same rank.

15. A method for determining an appropriate level of access authority for a person in a distributed computing environment, the method comprising:

maintaining a set of access credential information for node users;

maintaining a set of access credential information for admin users; wherein the set of access credential information for node users and the set of access credential information for admin users are maintained in respective separate name spaces;

accepting the person's request for access to the computer network, wherein the request includes the person's input credentials;

performing, during a first time period, an authentication against a node table, wherein the authentication against the node table includes comparing the person's input credentials to a set of access credential information for node users stored in the node table, and determining whether authentication against the node table is successful;

performing, during a second time period, an authentication against an admin table, wherein the authentication against the admin table includes comparing the person's input credentials to a set of access credential information for admin users stored in the admin table, and determining whether authentication against the admin table is successful;

wherein the first time period and the second time period at least partially overlap;

wherein the node table and the admin table are in a database;

wherein the node table contains a set of access credential information for a different class of users than the set of access credential information contained in the admin table;

wherein the node table and the admin table are ranked, with the admin table having a higher ranking than the node table;

ascertaining a level of access authority for the person, without the person specifying an intended level of access authority, wherein the ascertained level of access authority corresponds with the highest ranked set of access credentials for which authentication is successful;

and wherein the appropriate level of access authority for the person is ascertained without regard to a specific machine, location of the machine, IP address of the machine, and MAC address of the machine, from which the person's request is received.

16. A method for determining an appropriate level of access authority for a person in a distributed computing environment, the method comprising:

accepting the person's request for access to the computer network, wherein the request includes the person's input credentials;

performing, during a first time period, an authentication against a node table, wherein the authentication against the node table includes comparing the person's input credentials to a set of access credential information for node users stored in the node table, and determining whether authentication against the node table is successful;

performing, during a second time period, an authentication against an admin table, wherein the authentication against the admin table includes comparing the person's input credentials to a set of access credential information for admin users stored in the admin table, and determining whether authentication against the admin table is successful;

performing, during a third time period, an authentication against a third table, wherein the authentication against the third table includes comparing the person's input credentials to a set of access credential information for users stored in the third table, and determining whether authentication against the third table is successful;

performing, during a fourth time period, an authentication against a fourth table, wherein the authentication against the fourth table includes comparing the person's input credentials to a set of access credential information for users stored in the fourth table, and determining whether authentication against the fourth table is successful;

performing, during a fifth time period, an authentication against a fifth table, wherein the authentication against the fifth table includes comparing the person's input credentials to a set of access credential information for users stored in the fifth table, and determining whether authentication against the fifth table is successful;

wherein the first time period and the second time period and the third time period and the fourth time period and the fifth time period at least partially overlap;

wherein the node table and the admin table and the third table and the fourth table and the fifth table are in a database;

wherein the node table and the admin table and the third table and the fourth table and the fifth table each contain a set of access credential information that are respectively for different classes of users;

wherein the node table and the admin table and the third table and the fourth table and the fifth table are ranked, with the admin table having a higher ranking than the node table;

ascertaining a level of access authority for the person, without the person specifying an intended level of access authority, wherein the ascertained level of access authority corresponds with the highest ranked set of access credentials for which authentication is successful;

and wherein the appropriate level of access authority for the person is ascertained without regard to a specific machine, location of the machine, IP address of the machine, and MAC address of the machine, from which the person's request is received.

17. The method of claim 16, wherein the person's input credentials include a username and a password.

18. The method of claim 17, wherein the respective authentications against the node table, the admin table, the third table, the fourth table, and the fifth table, are performed in parallel.

* * * * *